Feb. 7, 1967  HANS-GEORG ZIMMERMANN  3,302,623
AIR COOLING FOR MULTI-UNIT ROTARY COMBUSTION ENGINES
Filed May 28, 1965  3 Sheets-Sheet 2

INVENTOR.
HANS-GEORG ZIMMERMANN
BY
ATTORNEY

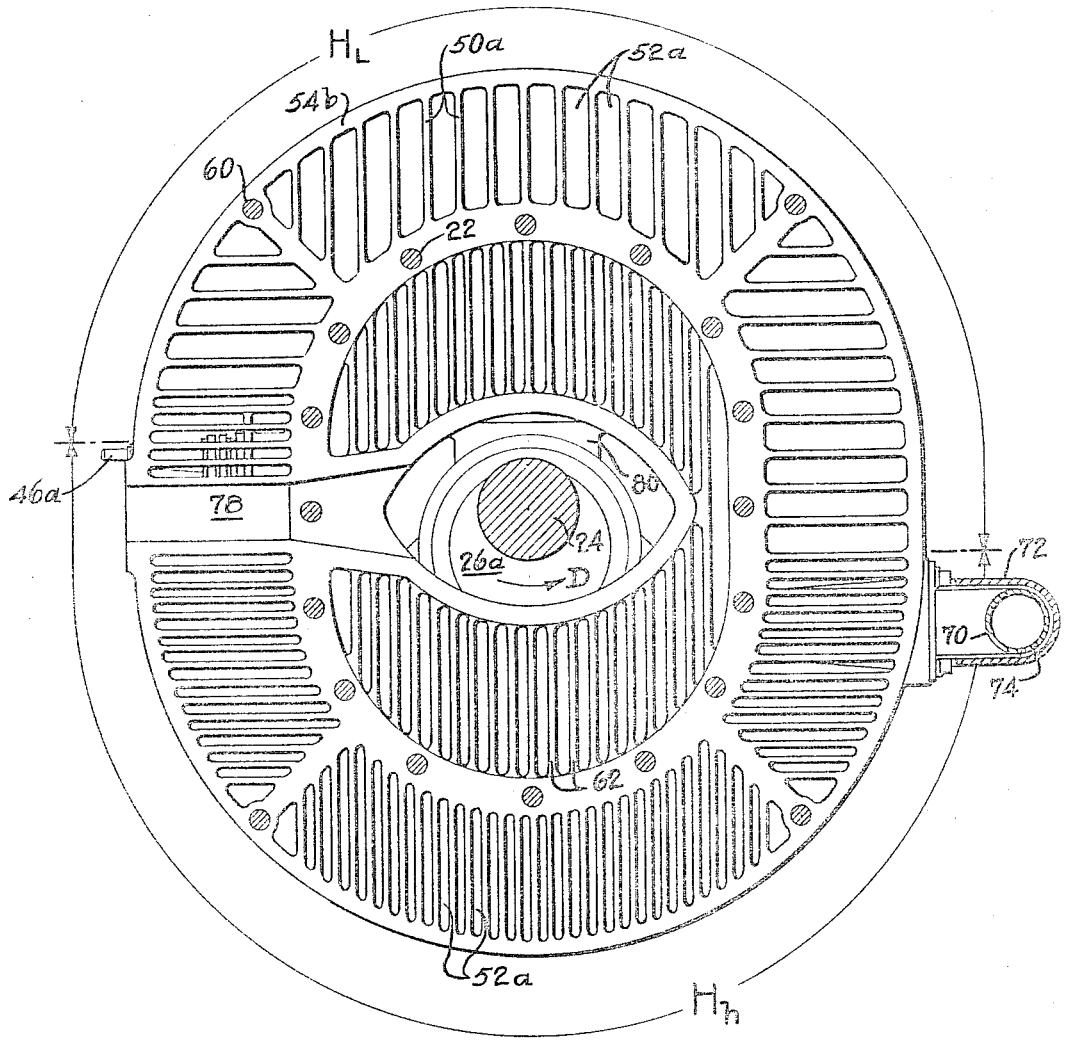

United States Patent Office 3,302,623
Patented Feb. 7, 1967

1

3,302,623
AIR COOLING FOR MULTI-UNIT ROTARY
COMBUSTION ENGINES
Hans-Georg Zimmermann, Heilbronn (Neckar), Germany, assignor to N.S.U. Motorenwerke Aktiengesellschaft, Neckarsulm, Germany, and Wankel G.m.b.H., Lindau (Bodensee), Germany
Filed May 28, 1965, Ser. No. 459,699
Claims priority, application Germany, June 13, 1964, N 25,112
6 Claims. (Cl. 123—8)

This invention relates to rotary combustion engines and is more particularly directed to an air cooling system for multi-unit rotary combustion engines utilizing an axial flow air cooling system.

In general, engines of the type described herein comprise an outer body having axially-spaced end walls interconnected with a peripheral wall to form a cavity therebetween. A rotor is mounted within said outer body and is disposed in sealing engagement with the inner surface of the peripheral wall and the axially-inner faces of the end walls and rotates relative to the outer body to form a plurality of working chambers which upon relative rotation of the rotor vary in volume. Intake means are provided for admitting air or a fuel-air mixture, ignition means may be provided for igniting said mixture and an exhaust means are provided for expelling the burnt gases from the engine so that the phases of intake, compression, expansion and exhaust may be carried out. Reference may be made to U.S. Patent 2,988,065 issued to Felix Wankel et al. on June 13, 1961, for a more detailed description of the operation of an engine of this type.

As is known in rotary combustion engines of the type described herein the individual phases of the working cycles carried out in each working chamber always occur at the same place relative to the housing resulting in considerably more heating-up in that part of the housing wherein combustion and expansion takes place than in that part of the housing wherein the intake phase takes place. Thus, there is no uniform input of heat around the periphery of the housing which must be taken into account when providing cooling for such an engine. It may be said therefore, that the heat input characteristics of an engine of the type described herein are characterized by having relatively high heat input sectors and relatively low heat input sectors with said sectors being circumferentially-spaced relative to the outer body axis. A novel axial flow air cooling system is provided for a single-unit rotary combustion engine and is described in copending application Serial No. 201,494 filed on June 11, 1962, now Patent No. 3,234,922 by Walter Froede and assigned to the same assignee as the present application. Reference may be made to said copending application for a more detailed explanation of the problems encountered in air cooling an engine of this type due to nonuniform heat input characteristics of said engine.

When using an axial flow air cooling system in a multi-unit rotary combustion engine, additional problems are encountered in insuring uniform cooling of the successive axially aligned units since the temperature of the cooling air increases as it flows from unit to unit and in order to have a properly balanced system consideration must be given to providing uniform cooling over the entire flow path. Thus, it will be seen that, if the relatively high heat input regions are axially aligned with one another in the successive units, the air will become substantially heated up in the early part of its flow path and will not adequately cool the downstream portion of the engine so that the cooling of the successive units will not be balanced. In other words, one unit may run at relatively higher temperatures than an adjacent unit.

2

The construction of the present invention achieves uniform cooling of the entire outer body of a multi-unit rotary combustion engine while using an axially flow system so that the operating temperatures of the individual units are substantially the same and the overall engine cooling will be balanced. The invention is generally carried out in, for example, a two-unit engine by rotating the outer bodies 180° relative to one another and by spacing the cooling fins so that the spacing between said cooling fins is closer together in the high heat input region of one unit, which matches with a relatively widely-spaced fin structure of an adjacent unit, as viewed in the axial direction. Through this arrangement the relatively low heat input region of one unit housing adjoins the relatively high heat input region of the adjacent unit and thus it is possible to obtain uniform cooling of the housing of both units since there is substantially no heating-up of the cooling air as it flows over the cool region of one unit and consequently a relatively high input region of the adjacent unit with the opposite being true in other regions of the cooling path.

Accordingly, it is one object of the invention to provide a novel and improved cooling system for a multi-unit rotary combustion engine.

It is a further object of the invention to provide an air cooling system for a multi-unit rotary combustion engine which system is balanced for providing substantially uniform cooling of the entire multi-unit rotary combustion engine.

It is an additional object of the invention to provide a novel and improved axially flow air cooling system for a multi-unit rotary combustion engine wherein balanced cooling of the successive units of the multi-unit rotary combustion engine is provided and with air cooling also being provided for the adjacent end walls of the adjoining units of said multi-unit rotary combustion engine.

Other objects and advantages of the invention will become apparent upon reading the following detailed description with the accompanying drawings in which:

FIG. 3 is a sectional view taken along line 3—3 of FIG. 1.

Figure 1:
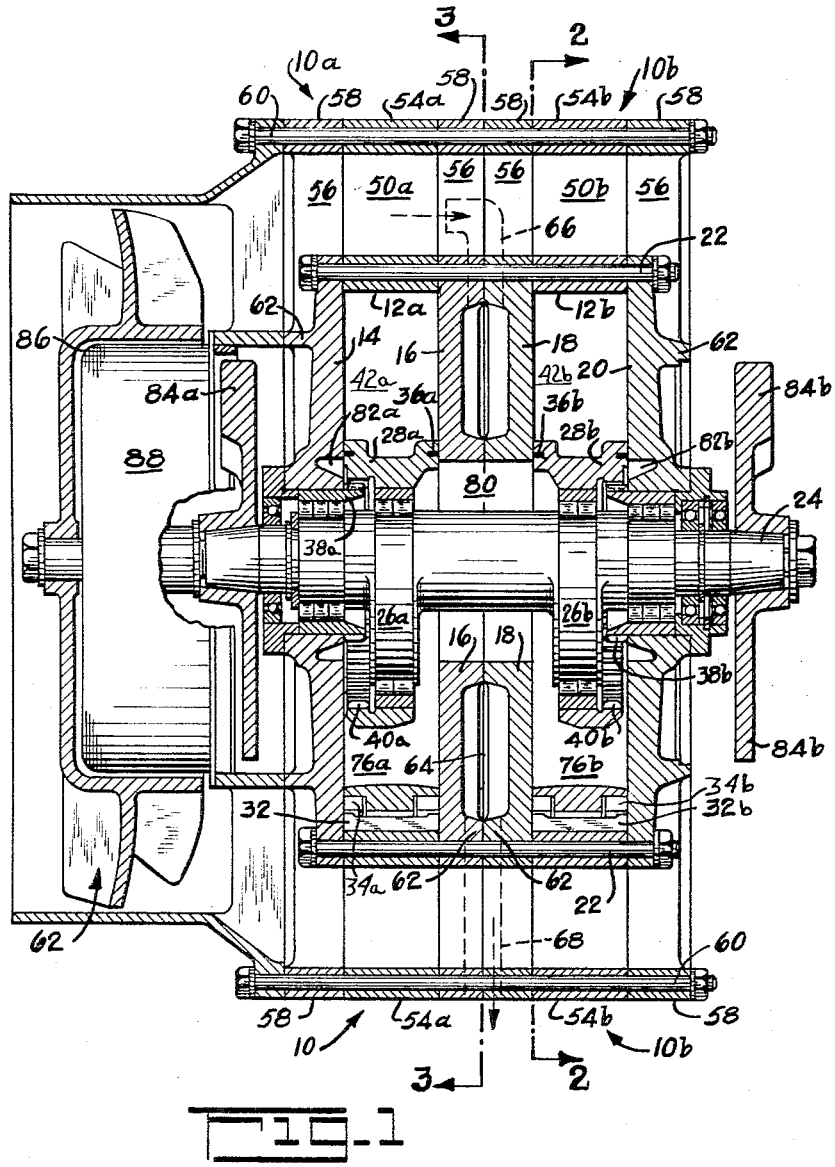
FIG. 1 is a sectional view of a rotary combustion engine embodying the present invention taken along line 1—1 of FIG 2.
Figure 2:
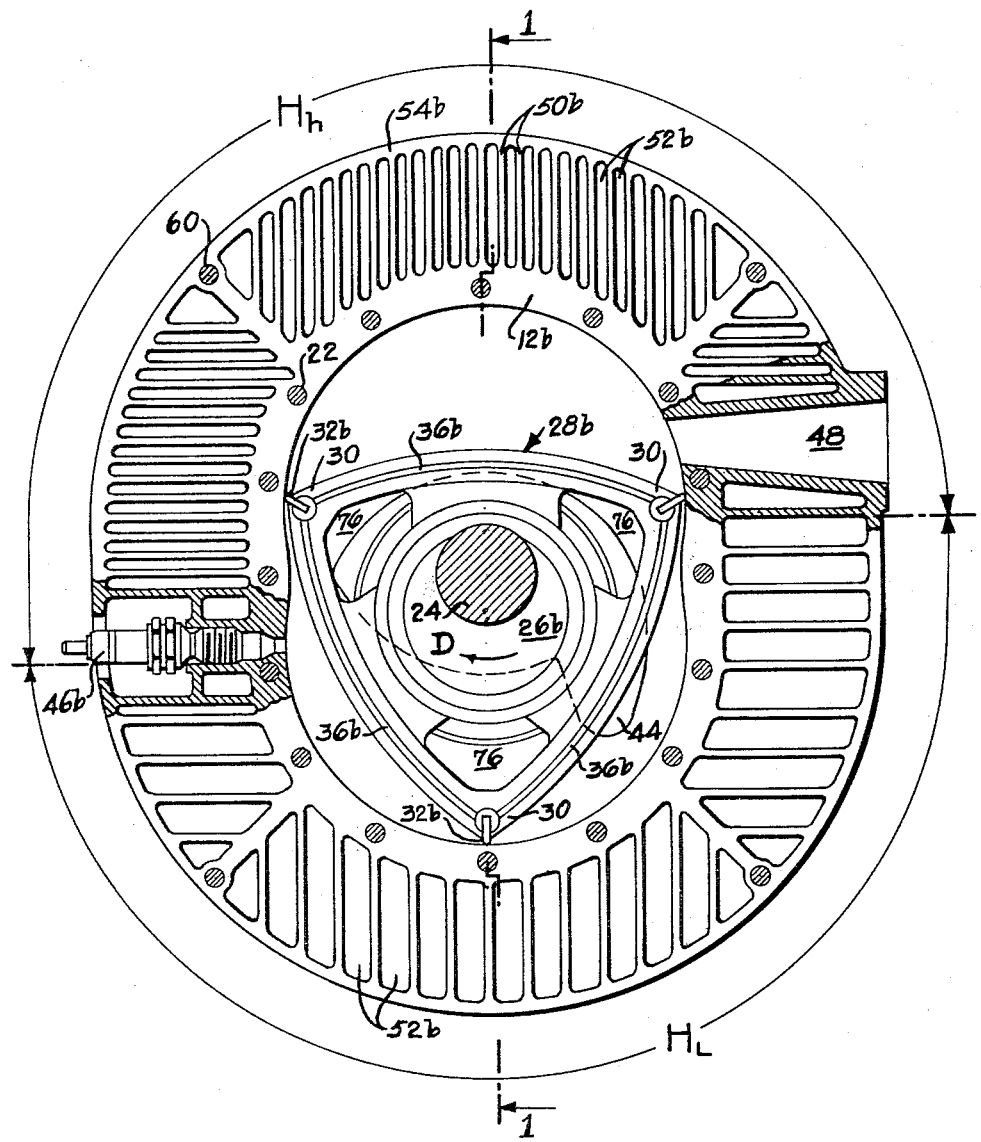
FIG. 2 is a sectional view taken along line 2—2 of FIG. 1.

Referring to the drawings, there is shown in FIG. 1, a multi-unit rotary combustion engine composed of two axially aligned rotary combustion units 10a and 10b. Each of the units 10a and 10b includes a peripheral wall 12a and 12b, respectively, whose inner surface has a profile which may be defined as being basically a two-lobed epitrochoid (FIG. 2). Unit 10a includes a pair of axially-spaced end walls 14 and 16 and the unit 10b includes a pair of axially-spaced end walls 18 and 20 with the end walls and peripheral walls being interconnected by bolts 22 extending through the entire length of the multi-unit rotary combustion engine. A shaft extends through the entire multi-unit rotary combustion engine and carries a pair of eccentric portions 26a and 26b, each being respectively disposed in the cavity of its associated unit 10a and 10b. Rotors 28a and 28b are respectively rotatably disposed on the eccentric portions 26a and 26b with each rotor having a multi-lobed profile including a plurality of apex portions 30 which are disposed in sealing contact with the inner surface of its associated peripheral wall.

Apex seal members 32a and 32b are respectively disposed in a groove in each apex portion of the associated rotor for maintaining sealing engagement with the inner surface of the associated peripheral wall 12a or 12b with each apex seal member 32a or 32b mating with an intermediate seal body 34a or 34b in its associated rotor 28a or 28b which intermediate seal bodies mate with side-face strips 36a and 36b respectively disposed in each side face of the associated rotor 28a and 28b. Stationary external gears 38a and 38b are respectively disposed in each end wall 14 and 20 which stationary gears 38a mate with internally-toothed gears 40a and 40b on each of the respective rotors 28a and 28b. The gears serve to maintain their associated rotors in describing their planetary motion relative to the outer body and do not serve to transmit any torque to the engine shaft 24. As the rotors 28a and 28b rotate relative to the outer body a plurality of working chambers are respectively formed in each of the units 10a and 10b which working chambers vary in volume during the relative rotation. The speed ratio between the shaft 24 and the rotors 28a and 28b in the engine illustrated is 3:1 which is positively maintained by means of the gearing consisting of the internally-toothed gears 40a and 40b respectively attached to the rotors 28a and 28b and the externally-toothed gears 38a and 38b supported by the end walls 14 and 20.

In order to supply air or a fuel-air mixture to the working chambers of each of the units 10a and 10b an intake port 44 is provided in each end wall 14 and 20, there being one such intake port 44 shown in end wall 20 in FIG. 2, with the intake port being periodically uncovered by the rotor and the side face seals 36a and 36b in the respective units to permit a supply of fuel or a fuel-air mixture to said working chambers during the intake phase. An ignition means 46, illustrated as a spark plug, may be provided for igniting the fuel-air mixture in the working chambers with at least one such spark plug 46 being supplied for each unit 10a and 10b. Each unit is also provided with an exhaust port 48 for discharging the combustion gases from the respective unit. It will be apparent therefore that during relative rotation of the rotors 28a and 28b the phases of intake, compression, combustion and exhaust will take place in each of the working chambers of each of the units 10a and 10b, with the rotation of each of the rotors being in the direction of the arrow D shown in FIGS. 2 and 3.

It will be seen that each of the stages or phases of the working cycle carried out in each working chamber always occurs in the same place relative to the outer body including the peripheral walls and end walls. Therefore, the outer body will be subjected to heat input which varies substantially around the circumference of said outer body relative to the axis thereof so that referring to the drawings, in particular FIGS. 2 and 3, it will be seen in FIG. 2, that relative to the direction of rotor rotation the zone extending in a circumferential direction from the spark plug 46 to the exhaust port 48 and labeled $H_h$ will be a region of relatively high heat input since the combustion and exhaust phases takes place in this region of the housing. In the region extending circumferentially from the exhaust port 48 to the spark plug 46 in the direction of rotor rotation, it will be seen that there will be a relatively low heat input, as indicated by the line labeled $H_L$, since the phases of intake and compression take place in this zone and the outer body will be kept relatively cool by fresh mixture introduced through the intake port 44. This variation in the heat input to the outer body makes it relatively difficult to provide simple means for cooling said outer body particularly with reference to providing a balanced uniform cooling over the entire body in a multi-unit mechanism.

For the purpose of air cooling the outer body of each of the rotary combustion units 10a and 10b, a plurality of axially extending fins 50a and 50b are provided on each of said units, respectively, with said fins being spaced from one another to provide axially extending cooling passages 52a and 52b therebetween. As seen in FIGS. 2 and 3 the axially extending fins 50a and 50b are divided into a plurality of fin sectors with the axially extending fins in each sector being parallel to the other fins of said sector so that a pluraltiy of parallel axially extending cooling passageways are provided in each fin sector. As further shown in the drawings, the fins 50a and 50b on the peripheral walls 12a and 12b extend between said peripheral walls and an outer housing portion 54a and 54b, respectively. Each of the end walls 14, 16, 18 and 20 are provided with axially extending fins 56 which meet with the adjacent fins on the peripheral walls and said fins 56 extend between the outer periphery of their associated end wall and an outer housing portion 58. Thus it will be seen that the axially extending cooling passages are provided over the entire axial length of the outer periphery of the combined rotary combustion engine units 10a and 10b. The outer housing portions 54a, 54b and 58 of each end wall are connected together by suitable bolts extending through the entire axial length of the engine, as shown at 60.

A blower 62 is provided at the upstream end of the engine for supplying the axial flow of cooling air which passes through the cooling air passages defined by the fins 50a and 50b on the peripheral walls and 56 on each of the end walls. As explained above, the heating up of the units 10a and 10b of the rotary combustion engine is not uniform around its periphery. In order to provide uniform cooling over the entire engine so that adequate cooling will be provided over the entire outer body of the engine, the outer bodies of the respective units 10a and 10b are turned 180° out of phase relative to one another so that as viewed in FIGS. 2 and 3 it will be seen that the relatively high heat input portions $H_h$ are out of phase from one another 180° relative to the direction of rotor rotation. In FIG. 1 it will be seen that the rotors 28a and 28b with their respective eccentric portions 26a and 26b occupy the same relative positions but as shown in FIGS. 2 and 3 it will be seen that their associated outer bodies are rotated out of phase with one another. It will be seen therefore that the cooling air will pass over the relatively high heat input region of one of the units for example unit 10a and downstream therefrom will pass over the relatively low heat input region of the successive unit or unit 10b. In another portion of the engine, for example, 180° away from the above mentioned portion, the cooling air will pass over the relatively low heat input region of the unit 10a and downstream therefrom will pass over the relatively high heat input region of the unit 10b. Hence, the cooling air will not be too heated up at its upstream portion to provide adequate cooling for the unit downstream of the first unit 10a in the direction of the flow of cooling air. It will be further seen in FIGS. 2 and 3 that the spacing between the cooling fins in the relatively high input regions of the outer body is substantially closer than in the region of relatively low heat input with the spacing being substantially a multiple of two times closer in the relatively high heat input region than in the relatively low heat input region.

The end walls 14, 16, 18 and 20 are provided with axially extending portions 62 which extensions serve to carry heat away from the end walls. The axially extending portions 62 formed as rib-like portions also provide a stiffening support of the outer surfaces of said end walls while serving to obtain good heat transfer from the outer faces of said end walls. Although the heat input to the end walls is not as great as that to the peripheral wall, axial extensions 62 provide a means for carrying heat away from said end wall surfaces but, if it is found that the cooling provided by the axial extensions 62 is not adequate, suitable means may be provided for passing a portion of the axial flow of cooling air passing over the engine outer surfaces of the end walls, such as that shown in copending application Serial No. 201,494, mentioned above.

The axially extending portions 62 on the end walls 16 and 18 are disposed so that they abut one another when the engine is assembled as shown in FIG. 1, and define therebetween a cavity portion 64. Air funnels 66 (shown in dotted lines in FIG. 1) may be provided around the periphery of the engine which air funnels are in communication with the cavity 64 and have a radially outer portion disposed in the path of the axial flow of cooling air for the purpose of supplying cooling air for cooling the axially facing surfaces of the end walls 16 and 18. This latter means may be provided if it is found that the axially extending portions 62 for said end walls 16 and 18 are not adequate for cooling these surfaces. A discharge pipe 68 (shown in dotted lines in FIG. 1) may be provided in another portion of the annular cavity 64 for removing the heated air from said cavity. The air from the discharge pipe 68 may be conveyed to the outer atmosphere by suitable openings provided in the outer housing portions 58 of the associated end walls 16 and 18 which communicate with the discharge pipe 68, said openings not being shown in the drawings. Means may also be provided for cooling the exhaust pipe connected to the exhaust port 50 by taking off a portion of the axial flow of cooling air and directing it over said exhaust pipe 70. An outer casing is provided around the exhaust pipe shown at 72 in FIG. 3 with said outer casing being spaced from said exhaust pipe to provide a cooling air passageway 74 therebetween with said outer casing 72 communicating with the blower 62 (not shown) to provide a supply of air for flow over the exhaust pipe 70.

Means are further provided for air cooling the interior of the rotors 28a and 28b. As seen in FIGS. 1 and 2 for example, the rotors 28a and 28b are provided with a plurality of chambers 76a and 76b. The chambers 26a and 26b are disposed adjacent the apex portions of the rotor at the outer periphery thereof. A common inlet channel 78 is disposed between the two end walls 16 and 18, FIG. 3, which inlet channel 78 communicates with a cavity or annular space 80 provided at the radially inner portions of the adjacent end walls 16 and 18. The annular cavity 80 is shaped so that as the rotor rotates relative to said cavity the portions of the rotor radially inward of the side face seals 36a and 36b will periodically uncover the cavity 80 to permit cooling air to flow into the chambers 76 of the rotors. Suitable means such as openings in the end walls 14 and 20 may be provided which connect with annular spaces 82a and 82b in said end walls 14 and 20 for carrying off the cooling air for discharge from the rotor cavities 76a and 76b.

As stated above, the rotors 28a and 28b and their eccentric portions 26a and 26b are disposed in the same relative position as viewed in FIG. 1. In order to balance the engine using an arrangement such as that illustrated, counter-balancing weights 84a and 84b may be provided at each end of the shaft to eliminate roughness in engine operation. However, it should be understood that the eccentric portions on the rotors may be rotated out of phase with one another to provide for relative counter-balancing between the rotors themselves. Also, a means for generating a current for the spark plug 46 may be provided on the engine shaft such as a magneto or the like and may be positioned within an annular space 86 formed by the blower housing 62 with said magneto or the like being designated at 88.

It will be seen from the above detailed description that a novel and improved axial flow air cooling means is provided for a multi-unit rotary combustion engine. The air cooling construction of the invention provides for a substantial uniform cooling of the entire engine with the relative cooling of the respective units being balanced so that the units operate at substantially the same operating temperatures. The cooling path of the engine is rather simple in construction in that the air flow path is a substantially straight through flow path with little obstruction making it possible to obtain good cooling efficiency and enabling a smaller output blower or fan to be used. Further, it will be seen that with respect to the periphery of the outer body of the entire multi-unit engine, that there is substantially no over cooling and wasting of cooling air in one region of the outer periphery while at the same time providing a balanced cooling in the regions of relatively high heat input.

While the invention has been set forth in detail in the above description, it will be apparent to those skilled in the art that various modifications and changes may be made without departing from the spirit and scope of the invention. I aim in the appended claims to cover all such modifications.

What is claimed is:

1. An air-cooled housing for a multi-unit rotary combustion engine including two coaxially aligned rotary combustion engine units having a common crankshaft and each said unit having an outer body including a pair of axially-spaced end walls interconnected with a peripheral wall to define a cavity, a multi-lobed rotor supported in each cavity for rotation relative to its associated outer body with said rotor being disposed in sealing engagement with the inner surface of said outer body to form a plurality of working chambers therebetween which chambers, during relative rotation between said rotor and its outer body, vary in volume, intake means for each unit disposed in a first region of its outer body for supplying air to the working chambers thereof for combustion adjacent a second region of its outer body, and exhaust means for each unit disposed in said second region of its outer body for discharging the combustion gases from each said unit, said second region of each said unit having a substantially higher heat input than said first region thereof, said air-cooled housing comprising; a plurality of spaced cooling fins projecting from the outer peripheral surface of each outer body with said fins on each unit extending in a direction parallel to the engine axis and being aligned with fins on the other unit to define a plurality of axially extending cooling air passages for conducting an axial flow of cooling air across the outer peripheral surface of each outer body of said multi-unit rotary combustion engine, and said rotary combustion engine units being disposed relative to one another, as viewed in the axial direction, with a first region of one of said units being aligned with a second region of the other of said units so that when cooling air is directed axially across the outer peripheral surface of said units it will first flow across a relatively low heat input region of one of said units and subsequently across a relatively high heat input region of the other of said units in one portion of the outer peripheral surface of said engine while in a portion circumferentially-spaced from said one portion the cooling air will first flow across a relatively high heat input region of said one unit and subsequently across a relatively low heat input region of said other of said units whereby a substantially balanced cooling of said engine housing outer surface is obtained.

2. An air cooled housing for a multi-unit rotary combustion engine as recited in claim 1 wherein the center of said first region of said one of said units is disposed 180° away from the center of the first region of said other of said units in the circumferential direction relative to the engine axis.

3. An ar cooled housing for a multi-unit rotary combustion engine as recited in claim 2 wherein the spacing of said fins in the second region of each of said units is substantially closer than the spacing of the fins in the first region thereof.

4. An air cooled housing for a multi-unit rotary combustion engine as recited in claim 3 wherein each fin in the first region of each of said units is axially aligned with a fin in the second region of the other of said units.

5. An air cooled housing for a multi-unit rotary combustion engine, as recited in claim 1, wherein the axially adjacent end walls of said units include a plurality of axially projecting rib members disposed in abutting relationship with at least some of said axially projecting rib members defining an enclosed annular cavity between said units and said annular cavity being provided with inlet and outlet openings for supplying and discharging cooling air to and from said annular cavity for cooling the axially confronting faces of said axially adjacent end walls.

6. An air cooled housing for a multi-unit rotary combustion engine as recited in claim 1 wherein each end wall is provided with a plurality of axially projecting spaced cooling fins on its outer surface for conducting heat away from the outer surface of said end walls.

References Cited by the Examiner
UNITED STATES PATENTS

| | | | |
|---|---|---|---|
| 2,988,065 | 6/1961 | Wankel et al. | 103—130 |
| 3,014,639 | 12/1961 | Boli | 230—209 |
| 3,062,435 | 11/1962 | Bentele | 230—145 |
| 3,096,746 | 7/1963 | Sollinger | 91—56 |
| 3,193,187 | 7/1965 | Jones et al. | 230—145 |
| 3,234,922 | 2/1966 | Froede | 123—8 |
| 3,261,335 | 7/1966 | Zimmermann | 123—8 |

References Cited by the Applicant
UNITED STATES PATENTS

| | | |
|---|---|---|
| 1,024,166 | 4/1912 | Weed. |
| 1,564,286 | 12/1925 | Smith. |
| 1,712,945 | 5/1929 | Thannhauser. |
| 2,079,192 | 5/1937 | Upshaw. |
| 2,112,844 | 4/1938 | Howard. |
| 2,856,753 | 10/1958 | Herzog. |
| 2,939,438 | 6/1960 | Bush. |

DONLEY J. STOCKING, *Primary Examiner.*

W. J. GOODLIN, *Assistant Examiner.*